(12) United States Patent
Zhan et al.

(10) Patent No.: US 11,042,293 B2
(45) Date of Patent: Jun. 22, 2021

(54) DISPLAY METHOD AND ELECTRONIC DEVICE

(71) Applicant: Lenovo (Beijing) Co., Ltd., Beijing (CN)

(72) Inventors: Peng Zhan, Beijing (CN); Helin Zhu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/728,776

(22) Filed: Dec. 27, 2019

(65) Prior Publication Data

US 2020/0210063 A1 Jul. 2, 2020

(30) Foreign Application Priority Data

Dec. 29, 2018 (CN) .......................... 201811641424.0

(51) Int. Cl.
*G06F 3/0488* (2013.01)
*G06F 3/0354* (2013.01)
*G06F 3/041* (2006.01)

(52) U.S. Cl.
CPC ...... *G06F 3/04886* (2013.01); *G06F 3/03547* (2013.01); *G06F 3/0412* (2013.01)

(58) Field of Classification Search
CPC .............. G06F 3/04886; G06F 3/0412; G06F 3/03547; G06F 1/1616; G06F 2203/0406; G06F 2203/0803; G06F 1/1643; G06F 1/1692; G06F 1/1618
See application file for complete search history.

(56) References Cited

U.S. PATENT DOCUMENTS

2014/0078055 A1  3/2014  Valentine et al.
2019/0369870 A1*  12/2019  Marsden ............. G06F 3/04892

FOREIGN PATENT DOCUMENTS

| CN | 104615371 A | 5/2015 |
| CN | 104834457 A | 8/2015 |
| CN | 106775216 A | 5/2017 |
| JP | 2010066915 A | 3/2010 |

* cited by examiner

*Primary Examiner* — Christopher J Kohlman
(74) *Attorney, Agent, or Firm* — Anova Law Group, PLLC

(57) ABSTRACT

A display method includes acquiring continuous input data input on an input apparatus of an electronic device and, in response to an input position of initial input data of the continuous input data satisfies a position condition during a process of continuously acquiring the continuous input data, adjusting a range of a target region on the input apparatus to keep an input position of the continuous input data within the range of the target region after being adjusted. The target region is configured to at least control a position of an indicator on a display apparatus of the electronic device.

18 Claims, 9 Drawing Sheets

DISPLAY METHOD AND ELECTRONIC DEVICE

CROSS-REFERENCE TO RELATED APPLICATION

This application claims priority to Chinese Patent Application No. 201811641424.0, filed on Dec. 29, 2018, the entire content of which is incorporated herein by reference.

FIELD OF THE TECHNOLOGY

This application relates to the field of electronic technology and, specifically, to a display method and electronic device.

BACKGROUND

For an electronic device with a double-sided display screen having a first screen and a second screen (or a large display screen having two display regions), one screen of the double-sided display screen (or one display region of the large display screen) is usually used as an input apparatus to perform input operations. For example, an input operation or a mouse cursor control operation can be performed through a virtual keyboard and a virtual touchpad on the second screen of the double-sided display screen. However, size of the display screen and size of the virtual keyboard limit space left for the virtual touchpad. Moreover, because a display screen surface is smooth, when a user uses the touchpad on the second screen, if the user looks at a position of a mouse cursor on the first screen without feeling of a physical touchpad, the user can easily move a finger beyond a range of the virtual touchpad. At this moment, the mouse cursor control operation is interrupted. Thus, the user needs to move the finger multiple times to ensure that the finger is within the range of a touchpad region on the screen.

SUMMARY

In accordance with the disclosure, there is provided a display method including acquiring continuous input data input on an input apparatus of an electronic device and, in response to an input position of initial input data of the continuous input data satisfies a position condition during a process of continuously acquiring the continuous input data, adjusting a range of a target region on the input apparatus to keep an input position of the continuous input data within the range of the target region after being adjusted. The target region is configured to at least control a position of an indicator on a display apparatus of the electronic device.

Also in accordance with the disclosure, there is provided an electronic device including a sensor configured to acquire continuous input data input on an input apparatus of the electronic device, a memory storing a computer program, and a processor configured to execute the computer program to obtain the continuous input data from the sensor and, in response to an input position of initial input data of the continuous input data satisfies a position condition during a process of continuously acquiring the continuous input data, adjust a range of a target region on the input apparatus to keep an input position of the continuous input data within the range of the target region after being adjusted. The target region is configured to at least control a position of an indicator on a display apparatus of the electronic device.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure, and those skilled in the art can obtain other drawings based on these drawings without inventive efforts.

DESCRIPTION OF EMBODIMENTS

To make clearer of the objectives, technical solutions, and advantages of the present disclosure, the followings further describes the present disclosure in detail with reference to the accompanying drawings. Obviously, the described embodiments are only some but not all of the embodiments of the present disclosure.

In the following description, terms such as "module," "part" or "unit" for referring to elements are used merely to facilitate explanation of the present disclosure, without having any significant meaning by themselves. Accordingly, the terms "module," "part," and "unit" may be used interchangeably.

The terminology used in the description of the various described embodiments herein is for the purpose of describing particular embodiments only and is not intended to be limiting. As used in the description of the various described embodiments and the appended claims, the singular form terms, such as "a," "an," and "the," are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if it is detected [a stated condition or event]" is, optionally, construed to mean "upon determining" or "in response to determining" or "upon detecting [the stated condition or event]" or "in response to detecting [the stated condition or event]," depending on the context.

In the following, mobile electronic devices will be described as examples for illustration. However, it would be understood by a person skilled in the art that the configuration according to embodiments of the present disclosure can be also applicable to the terminals with less or no mobility, such as digital TVs, desk top computers, and the like.

Figure 1A:
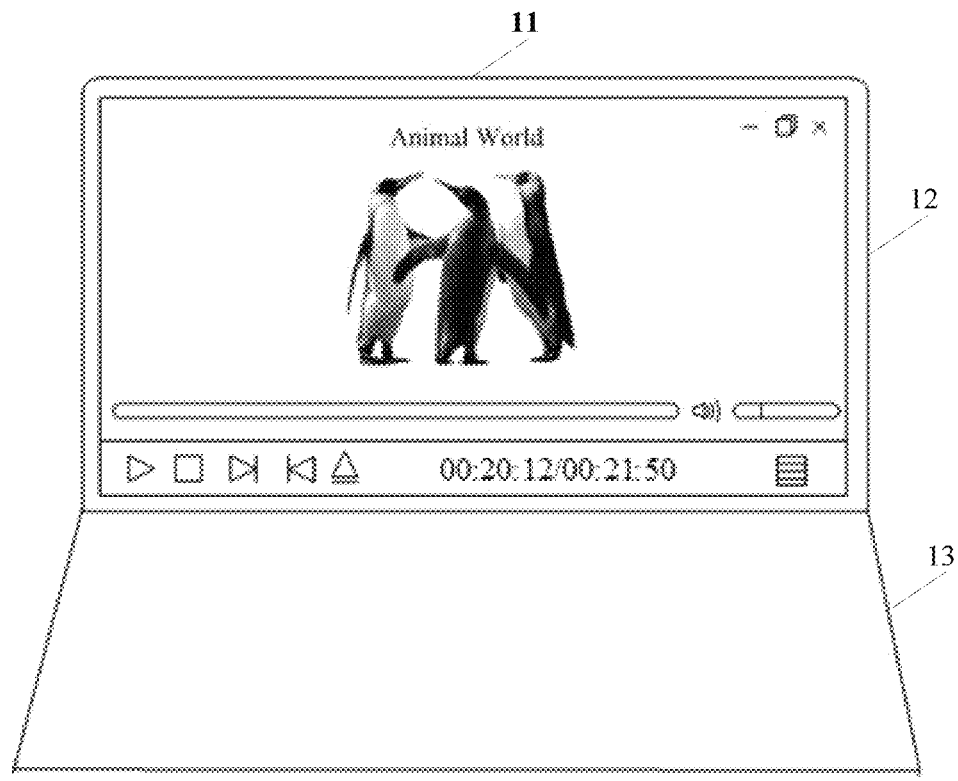
FIG. 1A is a diagram showing an interface of a multi-mode electronic device.

FIG. 1A is a diagram showing an interface of a multi-mode electronic device 11. As shown in FIG. 1A, the multi-mode electronic device 11 includes at least a first screen 12 and a second screen 13 (or a first region 12 and a second region 13 of a large screen). An angle α between the first screen 12 and the second screen 13 that can vary in a range of 0 to 360 degrees. Use modes of the multi-mode electronic device 11 may include a notebook mode, a tablet mode, and a tent mode. The first screen 12 is configured mainly to output display content. The second screen 13 is configured mainly to input data, which usually provides a keyboard and/or touchpad function. However, size of the screen and size of the virtual keyboard limit space left for a virtual touchpad. Moreover, when a user uses the touchpad on the second screen, if the user looks at a position of a mouse cursor on the first screen, the user can easily move a finger beyond a range of the virtual touchpad. At this moment, the mouse cursor control operation is interrupted. Because the touchpad is relatively small, the user needs to move the finger multiple times to ensure that the mouse cursor is moved to a target position.

Figure 1B:
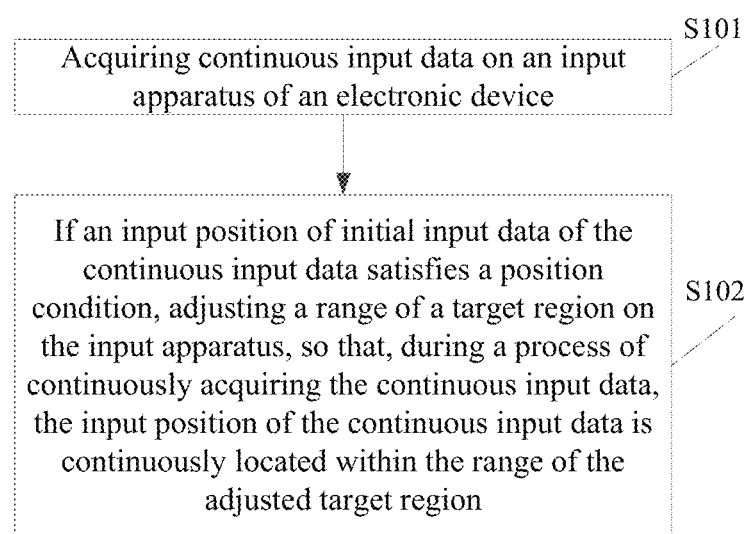
FIG. 1B is a schematic flowchart of a display method according to an embodiment of the present disclosure.

FIG. 1B is a schematic flowchart of a display method according to an embodiment of the present disclosure. As shown in FIG. 1B, the method includes the following processes.

S101: acquiring continuous input data on an input apparatus of an electronic device.

The electronic device may be implemented in various forms. In some embodiments, the electronic device described in the present disclosure may include a mobile electronic device such as a mobile phone, a smart phone, a notebook computer, a tablet computer, a digital broadcast receiver, a Personal Digital Assistant (PDA), a Portable Multimedia Player (PMP), a navigation device, a wearable device, or a fixed electronic device, such as a digital TV or a desk top computer.

For example, the electronic device is the multi-mode electronic device 11 shown in FIG. 1A. The input apparatus may be any apparatus having an input function or the second screen 13 of the multi-mode electronic device 11. The input apparatus can be used not only for inputting data, but also for outputting display content. The continuous input data can be understood as the user continuously operates on the input apparatus. For example, a user slides a finger continuously on the second screen 13 to achieve a mouse cursor control function or a display content zoom function on the first screen 12.

S102: if an input position of initial input data of the continuous input data satisfies a position condition, adjusting a range of a target region on the input apparatus, so that, during a process of continuously acquiring the continuous input data, the input position of the continuous input data is continuously located within the range of the adjusted target region.

In some embodiments, S102 is not performed after S101 is completed. Rather, whether the input position of the initial input data of the continuous input data satisfies the position condition is determined during the acquisition of the continuous input data at S101. If the input position of the initial input data of the continuous input data satisfies the position condition, the range of the target region on the input apparatus is adjusted. That is, as long as the input position of the initial input data of the continuous input data satisfies the position condition, the range of the target region on the input apparatus is adjusted while the continuous input data is being acquired.

The target region is at least used to control a position of an indicator on a display apparatus of the electronic device. The target region is also used to input a gesture instruction for controlling the display content on the display apparatus. That is, the target region may refer to a touchpad region which is used to control not only a mouse cursor (i.e., indicator on the display apparatus), but also the display content outputted by the display apparatus through the gesture (for example, controlling zooming in/out, and pulling up/down of the display content via gestures). The display apparatus may be any apparatus having a display function, or the first screen 12 of the electronic device. The display apparatus has a function to display the content, and the display apparatus may have a data input function in some situations.

Optionally, when the range of the target region is adjusted on the input apparatus, only the actual range for implementing the function of the target region is adjusted, whereas the display situation of the target region is not adjusted on the input apparatus. That is, when the range of the target region is changed, the display situation of the target region on the input apparatus may be changed accordingly or may not be changed.

In the present embodiment, during the process of acquiring the continuous input data on the input apparatus of the electronic device, if the input position of the initial input data satisfies the position condition, the range of the target region is adjusted. In this way, the input position of the continuous input data is maintained within the range of the adjusted target region. Thus, when the user enters the continuous input data on the second screen of the multi-mode electronic device with the finger, the operation interruption resulting from the finger sliding beyond the touch range of the touchpad region (that is, the target region) does not happen. The user does not need to constantly check whether the finger is located within the touch range of the touchpad region, and a better user experience is provided.

In some other embodiments, when the input position of the initial input data of the continuous input data satisfies the position condition, S102 is implemented in one of the following manners.

Manner 1: if the input position of the initial input data of the continuous input data satisfies the position condition, based on an input track corresponding to the continuous input data, the range of the target region on the input apparatus is continuously enlarged.

Figure 3A:
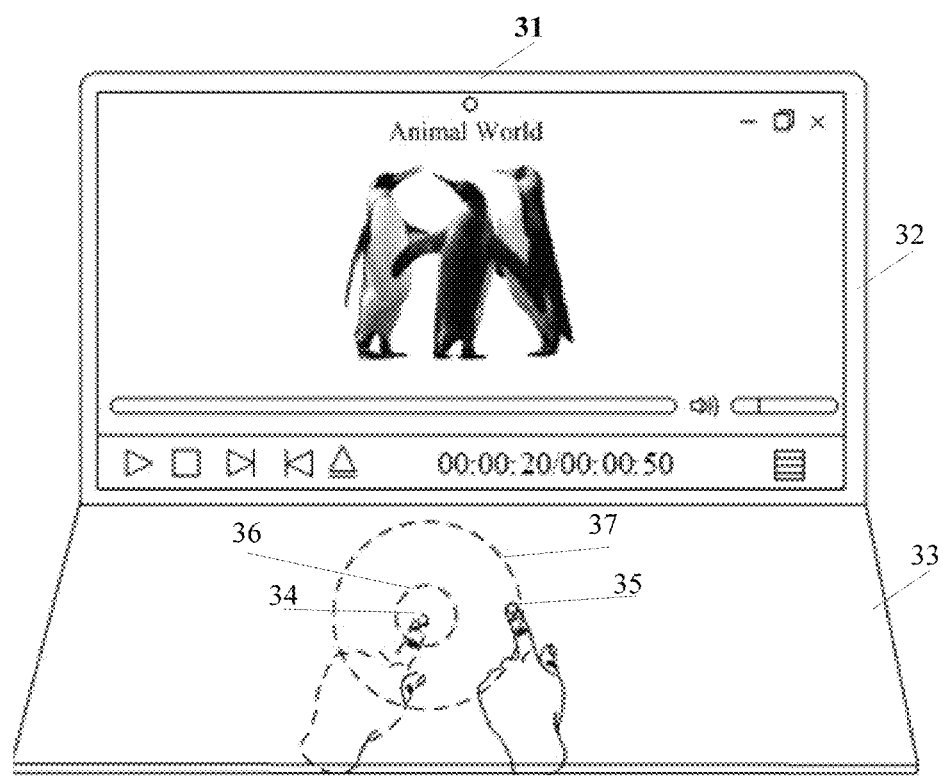
FIG. 3A is a diagram showing an interface for implementing a control method according to an embodiment of the present disclosure.
Figure 3B:
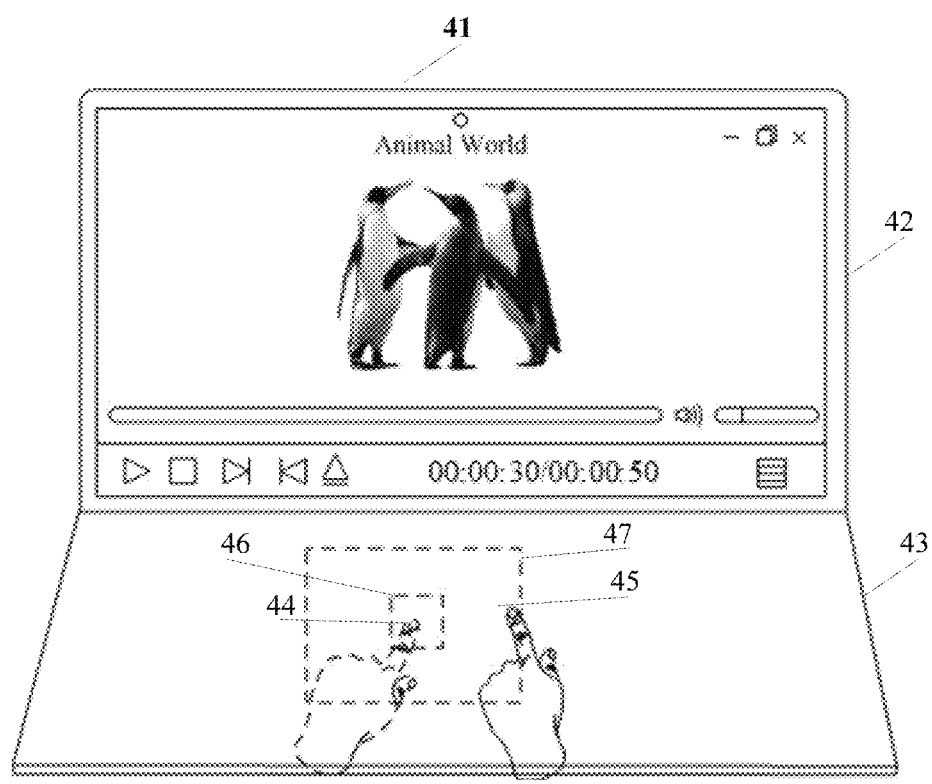
FIG. 3B is a diagram showing another interface diagram for implementing a control method according to an embodiment of the present disclosure.

In this manner, regardless of whether the input apparatus contains the target region before the continuous input data is acquired, as long as the input position of the initial input data satisfies the position condition, the range of the target region can be adjusted by regularly and synchronously increasing the range around the target region based on the input track corresponding to the continuous input data. For example, the target region is a circle, a movement distance of the input track is used as a radius of the circle, and the circular target region is enlarged progressively by increasing the radius of the circle. That is, the enlarged target region and the original target region are concentric circles. The enlarged target region and the original target region are circles that have a same center but different radii. FIG. 3A is a diagram showing an interface for implementing a control method according to an embodiment of the present disclosure. As shown in FIG. 3A, a multi-mode electronic device 31 includes a first screen 32 and a second screen 33. When a user slides a finger from a position 34 to a position 35, a target region 36 is enlarged to a target region 37. Thus, when the user slides the finger, the finger is always within the range of the enlarged target region. For another example, the target region is a rectangle, based on the movement distance of the input track, the rectangular target region is enlarged evenly. That is, the enlarged target region and the original target region have a same center point. FIG. 3B is a diagram showing another interface for implementing a control method according to an embodiment of the present disclosure. As shown in FIG. 3B, a multi-mode electronic device 41 includes a first screen 42 and a second screen 43. When a user slides a finger from a position 44 to a position 45, a rectangular target region 46 is enlarged to a target region 47. Thus, when the user slides the finger, the finger is always within the range of the enlarged target region.

In one embodiment, based on the input track corresponding to the continuous input data, the range of the target region may be adjusted by irregularly enlarging the range of the target region. For example, an original target region is a circle, and the range of the target region is enlarged toward a movement direction of the input track. That is, the enlarged target region is an irregular shape.

Manner 2: if the input position of the initial input data of the continuous input data satisfies the position condition, the range of the target region on the input apparatus is adjusted to a threshold range.

Figure 3C:
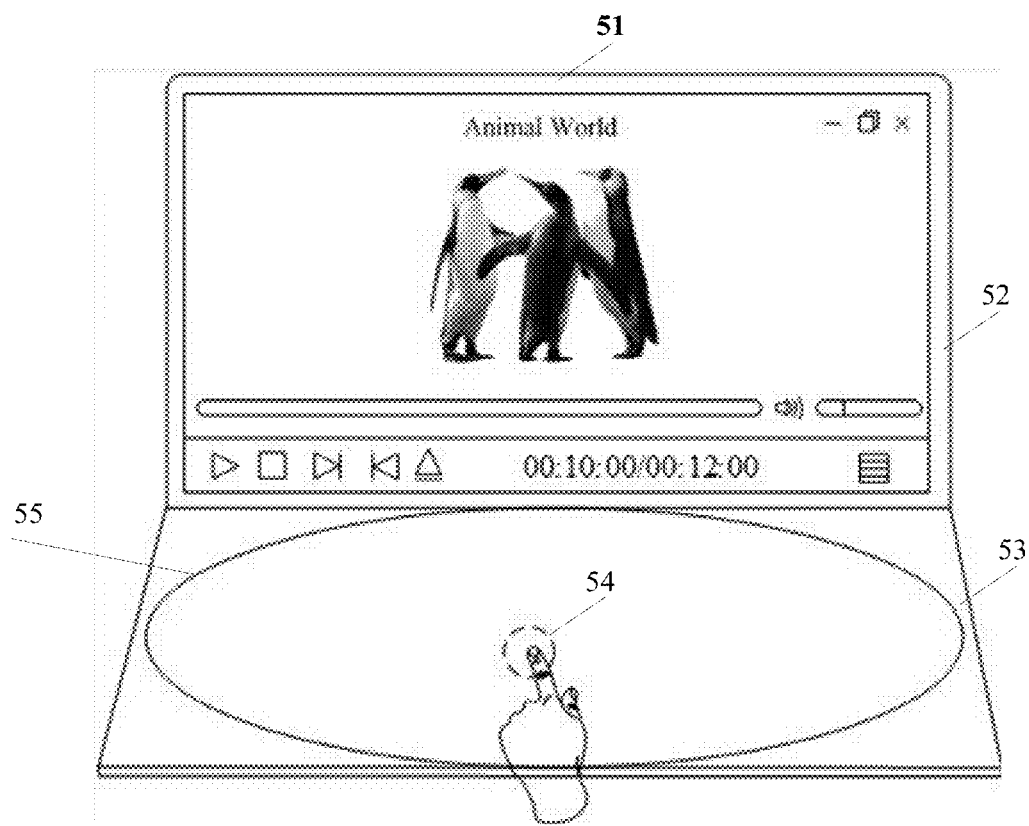
FIG. 3C is a diagram showing another interface diagram for implementing a control method according to an embodiment of the present disclosure.

In this manner, regardless of whether the input apparatus contains the target region before the continuous input data is acquired, as long as the input position of the initial input data satisfies the position condition, the range of the target region on the input apparatus is adjusted to the threshold range. If it is determined that the input position of the initial input data satisfies the position condition, the range of the target region is directly adjusted to a range of a specific size. For example, an original target region is a circular region with a radius of 5 cm, when a user enters the initial input data with a finger and the touch region is within the circular region, the circular target region is adjusted to an oval region with a specific range. FIG. 3C is a diagram showing another interface for implementing a control method according to an embodiment of the present disclosure. As shown in FIG. 3C, a multi-mode electronic device 51 includes a first screen 52 and a second screen 53. When the input position of the initial input data is within a touchpad region 54 on the second screen (that is, when the input position satisfies the position condition), the touchpad region 54 is adjusted to a threshold range 55.

Figure 3D:
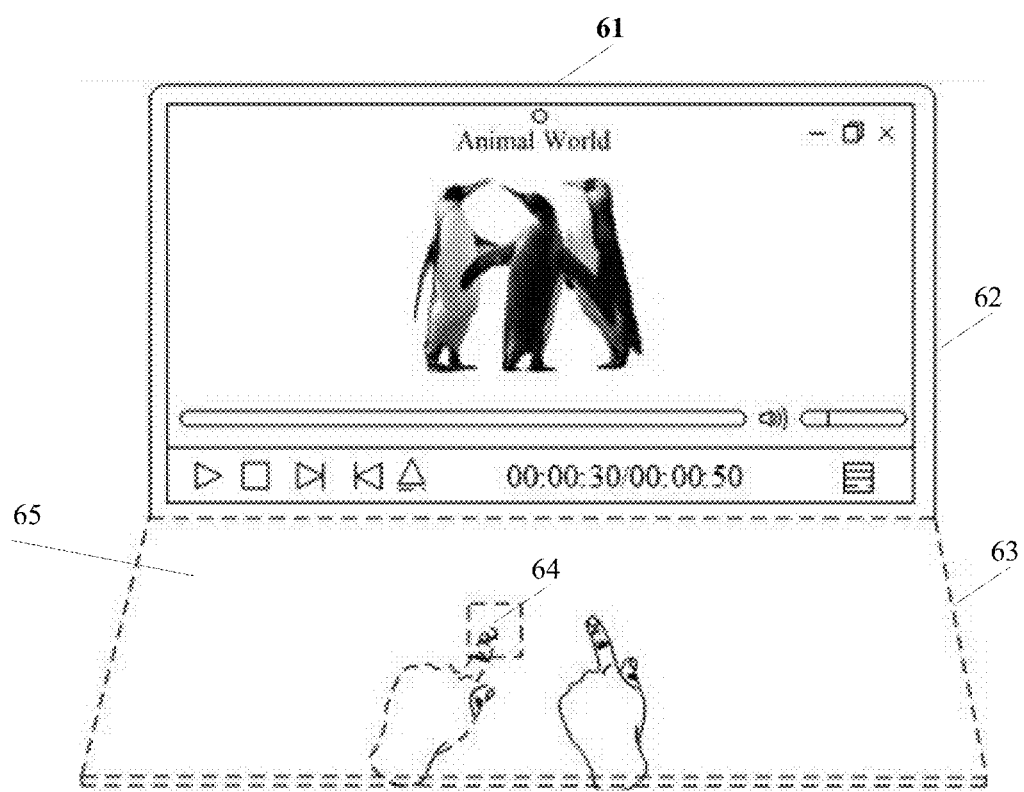
FIG. 3D is a diagram showing another interface diagram for implementing a control method according to an embodiment of the present disclosure.

For adjusting the range of the target region on the input apparatus to a threshold range, if it is determined that the input position of the initial input data satisfies the position condition, the target region may be directly adjusted to the region that is the same size as the region of the input apparatus. That is, the entire region of the input apparatus is the target region. For example, the range of the original target region is a rectangle with a side length of 4 cm. When a user enters the initial input data with a finger and the touch region is within a specific region, the rectangular target region is adjusted to a range having a same range as the region of the input apparatus. FIG. 3D is a diagram showing another interface for implementing a control method according to an embodiment of the present disclosure. As shown in FIG. 3D, a multi-mode electronic device 61 includes a first screen 62 and a second screen 63. When the input position of the initial input data is within a touchpad region 64 on the second screen (that is, when the input position satisfies the position condition), the touchpad region 64 is adjusted to a region 65 that is the same range as the second screen. Thus, when a user enters the initial input data with a finger and the touch region is within a specific region, the target region is enlarged to the region of the entire input apparatus. The touch range is very large, which is convenient for moving a mouse cursor.

Manner 3: if the input position of the initial input data of the continuous input data satisfies the position condition, a position of the target region is changed with the range of the input track corresponding to the continuous input data.

In this manner, regardless of whether the input apparatus contains the target region before the continuous input data is acquired, as long as the input position of the initial input data satisfies the position condition, the position of the target region is changed with the range of the input track corresponding to the continuous input data. That is, shape and size of the target region remain the same, but the position of the target region changes as the input track changes. For example, when a user enters the initial input data with a finger and the touch region is within a specific region, the position of the target region changes along with movement of the finger on the input apparatus. That is, when the user moves the finger to a certain position on the input apparatus, the target region is moved to the same position as the position of the finger. Therefore, the input position of the continuous input data remains within the range of the adjusted target region.

Figure 3E:
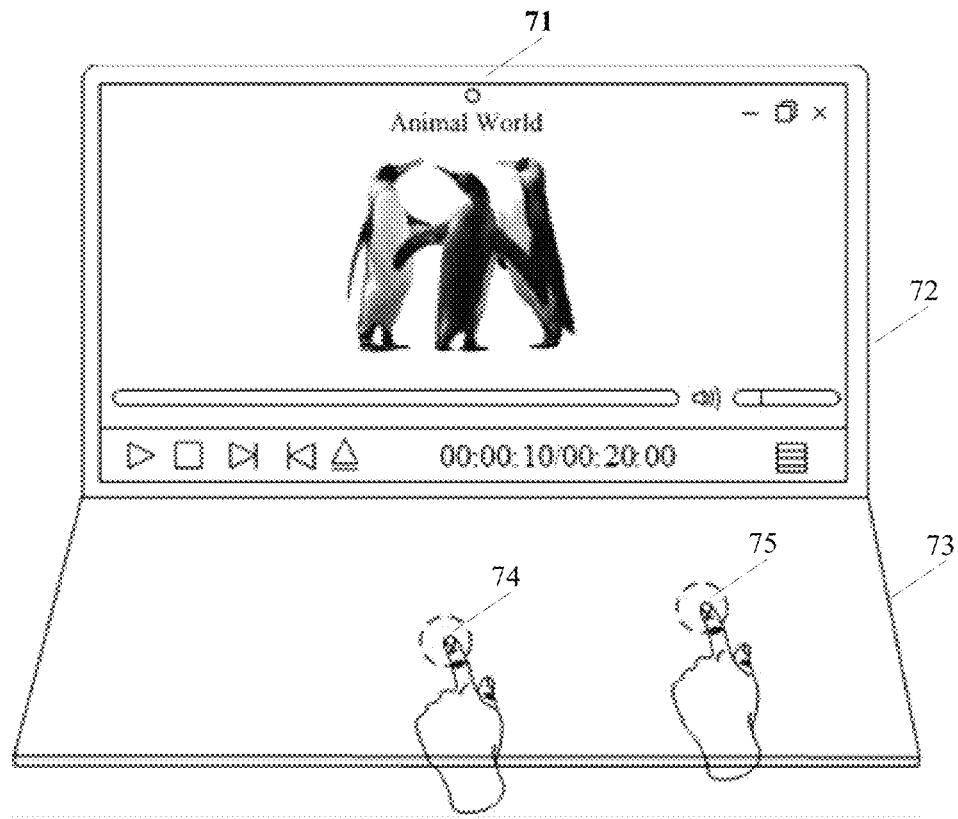
FIG. 3E is a diagram showing another interface diagram for implementing a control method according to an embodiment of the present disclosure.

FIG. 3E is a diagram showing another interface for implementing a control method according to an embodiment of the present disclosure. As shown in FIG. 3E, a multi-mode electronic device 71 includes a first screen 72 and a second screen 73. When the input position of the initial input data is within a touchpad region 74 on the second screen (that is, when the input position satisfies the position condition), the touchpad region 74 is moved to a touchpad region 75 with the finger sliding track.

Figure 2A:
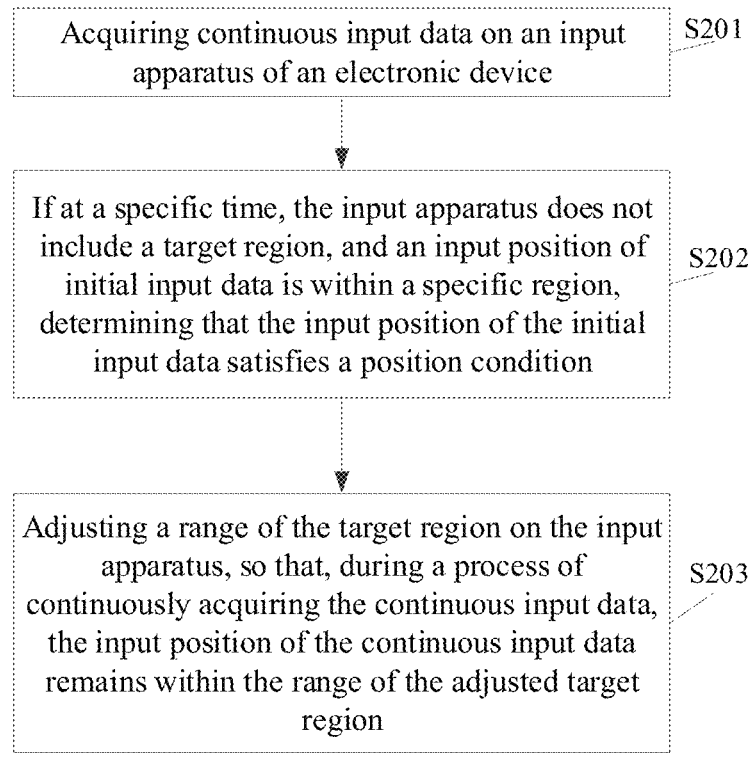
FIG. 2A is a schematic flowchart of another display method according to an embodiment of the present disclosure.

In some embodiments, a display method is provided. FIG. 2A is a schematic flowchart of another display method according to an embodiment of the present disclosure. As shown in FIG. 2A, the method includes the following processes.

S201: acquiring continuous input data on an input apparatus of an electronic device.

For example, the electronic device is a multi-mode electronic device. In S201, when the input apparatus is a second screen of the multi-mode electronic device, a user enters data by sliding a finger on the input apparatus. The continuous input data can be understood as the user continuously touches the input apparatus with the same finger or different fingers. For example, the user initially touches the input apparatus with three fingers, and later the user touches the input apparatus with two fingers or four fingers.

S202: if, at a specific time, the input apparatus does not include a target region, and an input position of initial input data is within a specific region, determining that the input position of the initial input data satisfies a position condition.

S203: adjusting a range of the target region on the input apparatus, so that, during a process of continuously acquiring the continuous input data, the input position of the continuous input data is remains within the range of the adjusted target region.

In some embodiments, S202 and S203 are not performed after S201 is completed. Rather, whether the input position of the initial input data of the continuous input data satisfies the position condition is determined during the acquisition of the continuous input data at S201. If the input position of the initial input data of the continuous input data satisfies the position condition, the range of the target region on the input apparatus is adjusted synchronously.

The specific time is the time to start acquiring the continuous input data. The specific region may be a region with a specific shape at a specific position on the input apparatus. For example, for the region with a specific shape on the input apparatus, if the input apparatus includes a virtual keyboard, the specific region may be a circular region added between some keys (for example, G, H, B) on the virtual keyboard, and the circular region is displayed using a contrasting color (for example, red/green fluorescence, etc.) against colors of other regions. When the user touches the circular region with one or more fingers, the entire input apparatus becomes a touchpad which can be used to move a mouse cursor. After the user lifts all the fingers off the circular region, the entire input apparatus is switched back to a keyboard mode. The input apparatus does not contain the target region at the specific time. That is, before acquiring the continuous input data on the input apparatus, the input apparatus does not contain the target region. For example, if the input apparatus is the second screen of the multi-mode electronic device, before a user touches the second screen to activate a mouse function and enter the continuous input data, the second screen does not contain a touchpad region. When the user touches a specific region with a finger (for example, a user touches the circular region with a finger), it is determined that the input position of the initial input data satisfies the position condition, and the range of the target region is adjusted. Thus, the middle region of the virtual keyboard is set to a specific region as the touchpad region, so that the trigger position of the touchpad is reasonable. For a typing gesture operation or a mouse cursor control operation, the position of a trigger point is relatively comfortable and easy for the user to operate.

Furthermore, the range of the target region on the input apparatus may be adjusted by any one of the above manners 1, 2, and 3. The adjustment process is as follows.

For an adjustment of the range of the target region on the input apparatus according to manner 1, if it is detected that the input position of the initial input data is within a specific region (for example, a preset circular region), a touchpad function of the input apparatus is activated. Then, based on the input track corresponding to the continuous input data, the range of the target region on the input apparatus is continuously enlarged.

For an adjustment of the range of the target region on the input apparatus according to manner 2, if it is detected that the input position of the initial input data is within a specific region, the range of the target region on the input apparatus is adjusted directly to a threshold range. For example, if it is detected that the position of a finger touching the second screen at a first time is within a certain circular region, the entire second screen becomes a touchpad. That is, the entire second screen is the target region.

For an adjustment of the range of the target region on the input apparatus according to manner 3, if it is detected that the input position of the initial input data is within a specific region, the position of the target region is changed with the range of the input track corresponding to the continuous input data. That is, if it is detected that the input position of the initial input data is within a specific region, the touchpad function of the input apparatus is activated, and then the position of the target region is changed along with the finger sliding track.

During the process of adjusting the range of the target region, content displayed on the input apparatus remains unchanged. That is, during the process of adjusting the range of the target region, the content displayed on the input apparatus does not change. For example, the input apparatus is the second screen of the multi-mode electronic device. The virtual keyboard is displayed on the second screen, and a user touches a specific region (for example, a circular region) with a finger. As the user continuously slides the finger, the range of the target region is adjusted to the same size of the second screen. However, the content currently displayed on the second screen does not change (that is, the virtual keyboard is still displayed on the second screen). At this moment, the keyboard function is disabled. The input apparatus implements the functions of the target region.

In some embodiments, during the process of adjusting the range of the target region, the adjusted target region on the input apparatus is displayed based on a transparence parameter. For example, when the range of the target region is adjusted, the adjusted target region may be displayed with a transparency of, e.g., 25%, 50%, or 75%, or be displayed as being opaque. The adjusted target region can be a newly added region or the entire target region after adjustment. Further, in some embodiments, during the process of adjusting the range of the target region, functions other than the touchpad function are suspended in a region covered by the newly added target region.

S204, if the process of continuously acquiring the continuous input data is completed, adjusting the input apparatus from a current state to an original state.

In S204, the process of continuously acquiring the continuous input data being completed can refer to that all fingers touching the input apparatus being lifted off the input apparatus. For example, the three fingers sliding on the second screen of the multi-mode electronic device are all lifted off the second screen. As described above, when the target region is adjusted, functions other than the touchpad function corresponding to the covered region have been suspended. Thus, the input apparatus being adjusted from the current state to the original state can refer to that, when all the fingers touching the input apparatus are lifted off the input apparatus, the suspended functions corresponding to the covered region are resumed. For example, when a finger slides on the second screen, if the enlarged target region covers the region that implements a playback function on the second screen, the playback function is paused first. When the finger leaves the second screen, the playback function of the covered region is resumed.

Figure 2B:
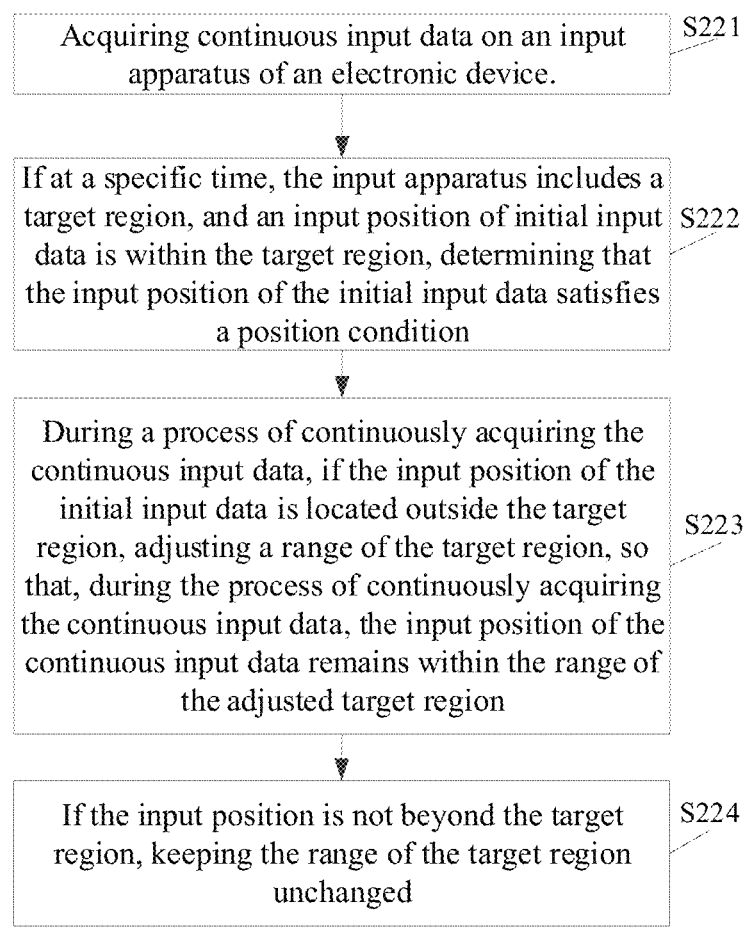
FIG. 2B is a schematic flowchart of another display method according to an embodiment of the present disclosure.

In one embodiment of the present disclosure, a display method is provided. FIG. 2B is a schematic flowchart of another display method according to an embodiment of the present disclosure. As shown in FIG. 2B, the method includes the following processes.

S221: acquiring continuous input data on an input apparatus of an electronic device.

S222: if, at a specific time, the input apparatus includes a target region, and an input position of initial input data is within the target region, determining that the input position of the initial input data satisfies a position condition.

For example, the electronic device is a multi-mode electronic device. In S222, if the input apparatus is the second screen of the multi-mode electronic device, which, before the continuous input data is acquired, contains a square touchpad region with a side length of 5 cm, and the position of the finger entering the initial input data is within the target region, then it is determined that the position of the finger entering the initial input data satisfies the position condition.

S223: during a process of continuously acquiring the continuous input data, if the input position of the initial input data is located outside the target region, adjusting a range of the target region, so that, during the process of continuously acquiring the continuous input data, the input position of the continuous input data remains within the range of the adjusted target region.

In some embodiments, S222 and S223 are not performed after S221 is completed. Rather, whether the input position of the initial input data of the continuous input data satisfies the position condition is determined during the acquisition of the continuous input data at S221. If the input position of the initial input data of the continuous input data satisfies the position condition, the range of the target region on the input apparatus is adjusted synchronously.

The range of the target region on the input apparatus may be adjusted by any one of the above manners 1, 2, and 3. The adjustment process is as follows.

For an adjustment of the range of the target region according to manner 1, if it is detected that the input position of the initial input data is within the target region (for example, the touchpad region of the second screen), based on the input track corresponding to the continuous input data, the range of the target region on the input apparatus is continuously enlarged.

For an adjustment of the range of the target region according to manner 2, if it is detected that the input position of the initial input data is within the target region, the range of the target region on the input apparatus is adjusted directly to a threshold range. For example, if it is detected that the position of the finger touching the second screen at a first time is within the target region, the entire second screen becomes a touchpad. That is, the entire second screen is the target region.

For an adjustment of the range of the target region on the input apparatus according to manner 3, if it is detected that the input position of the initial input data is located within the target region, the position of the target region is changed with the range of the input track corresponding to the continuous input data. That is, if it is detected that the input position of the initial input data is within the target region, the touchpad function of the input apparatus is activated, and then the position of the target region is changed along with the finger sliding track.

In one embodiment, S223 can include, when a finger slides on the second screen, if the position of the finger is beyond the touchpad region, the range of the target region is adjusted based on the sliding track of the finger. For example, the range of the target region is enlarged in order to enlarge the touchpad region, which ensures that the operation is not interrupted during the sliding process because the position of the finger is always within the target region. Thus, the range of the touchpad region is enlarged, and the operation is performed without the need to lift and move the finger multiple times.

S224: if the input position is not beyond the target region, keeping the range of the target region unchanged.

In S224, when a finger slides on the second screen, if the position of the finger is not beyond the touchpad region, the range of the touchpad region remains unchanged.

In the above S223 and S224, a precondition for "adjusting the range of the target region" is provided. That is, only when the input position is beyond the target region, the range of the target region is adjusted as the input track changes, to ensure that the input position remains within the range of the adjusted target region, hence avoiding operation interruption due to the finger sliding beyond the touchpad region.

In this embodiment, the input apparatus includes the target region before the continuous input data is acquired, and the position of the finger entering the initial input data is in the target region. During the process of continuous finger sliding, when the sliding track is beyond the target region, the range of the target region is adjusted to ensure that the finger sliding position is not beyond the range of the adjusted target region, so as to provide a better user experience.

In some scenarios, the touchpad function of the multi-mode electronic device can be activated via a virtual key. When the virtual key is pressed, a space bar region and a blank space below the space bar region are used as the touchpad region. When the touchpad function is not needed, the regions switch back to the keyboard mode. However, it is not convenient for the user to operate, and during the operation process, the user needs to switch back and forth between the keyboard mode and the touchpad mode. Moreover, after the touchpad function is activated, the space bar cannot be pressed, and the user needs to switch back to the keyboard mode by clicking a key on the keyboard. If the user moves the finger out of the touch region, the touchpad function becomes invalid. The present disclosure provides a display method by adding a circular region between the keys G, H, and B of a virtual keyboard, and presenting the circular region using a contrasting color (for example, red/green fluorescence, etc.) against colors of other regions. When a finger touches the circular region, the entire touch screen becomes a touchpad region. The keyboard is blurred and only an afterimage that is difficult to recognize is displayed, which indicates that the current mode is a touch mode. After all the fingers are lifted off, the touch screen switches back to the keyboard mode. As such, the position of the trigger point for the touchpad region is reasonable. No matter whether the user is typing or operating a mouse cursor, the position of the trigger point is relatively comfortable for the user. It is easy for the user to operate the mouse cursor because the touch range is very large. Since no virtual key is provided on the electronic device, the user does not need to operate the electronic device using both hands.

In addition, when the user uses the touchpad of the virtual keyboard and looks at the position of the mouse cursor, the user can easily move the finger beyond the range of the touchpad. At this moment, the mouse cursor control operation is interrupted. Since the touchpad is relatively small, multiple operations need to be performed to move the mouse cursor to the target position. Thus, in one embodiment of the present disclosure, when the user enters the initial input data with the finger, if the user presses the touchpad region (i.e., the target region), the current touch point is set for the mouse cursor control operation. When the user moves the finger out of the range of the target region, the range of the target region is adjusted. That is, the range of the target region is correspondingly expanded along with the finger sliding track and the adjusted target region covers other keys in a translucent manner. After the user lifts the finger, the expanded target region part disappears, and the covered keys can be used normally again. Therefore, the operation interruption due to the finger sliding out of the target region does not happen. The user does not need to frequently check whether the finger position is within the target region.

An embodiment of the present disclosure provides an electronic device. Each module of the electronic device, and each unit of a module can be implemented by a processor of a computer device, or by a specific logic circuit. The processor may be, e.g., a central processing unit (CPU), a microprocessor (MPU), a digital signal processor (DSP), or a field programmable gate array (FPGA).

Figure 4:
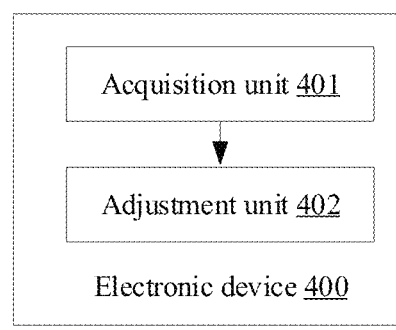
FIG. 4 is a schematic structural diagram of an electronic device according to an embodiment of the present disclosure.

FIG. 4 is a schematic structural diagram of an electronic device according to an embodiment of the present disclosure. As shown in FIG. 4, the electronic device 400 includes an acquisition unit 401 and an adjustment unit 402.

The acquisition unit 401 is configured to acquire continuous input data on an input apparatus of an electronic device.

The adjustment unit 402 is configured to, if an input position of initial input data of the continuous input data satisfies a position condition, adjust a range of a target region on the input apparatus, so that, during a process of continuously acquiring the continuous input data, the input position of the continuous input data remains within the range of the adjusted target region.

The target region is at least used to control a position of an indicator on a display apparatus of the electronic device.

In the above electronic device, if at a specific time, the input apparatus does not include the target region, and the input position of the initial input data is within a specific region, it is determined that the input position of the initial input data satisfies a position condition. The specific time is the time to start acquiring the continuous input data.

In the above electronic device, if at a specific time, the input apparatus includes the target region, and the input position of the initial input data is within the target region, it is determined that the input position of the initial input data satisfies the position condition.

The adjustment unit 402 of the electronic device may include a first adjustment module and a second adjustment module.

The first adjustment module is configured to, if the input position of the initial input data of the continuous input data satisfies the position condition, based on an input track corresponding to the continuous input data, continuously enlarge the range of the target region on the input apparatus.

The second adjustment module is configured to, if the input position of the initial input data of the continuous input data satisfies the position condition, adjust the range of the target region on the input apparatus to a threshold range.

In the above electronic device, the adjustment unit 402 may further include a first control module. The first control module is configured to, if the input position of the initial input data of the continuous input data satisfies the position condition, change the position of the target region with the range of the input track corresponding to the continuous input data.

In some embodiments, the electronic device may further include a restoration unit. The restoration unit is configured to, if the process of continuously acquiring the continuous input data is completed, adjust the input apparatus from a current state to an original state. The original state is a corresponding state before the continuous input data is acquired.

In some embodiments, during the process of continuously acquiring the continuous input data, if the input position of the initial input data is beyond the target region, the range of the target region on the input apparatus is adjusted, so that, during the process of continuously acquiring the continuous input data, the input position of the continuous input data remains within the range of the adjusted target region. If the input position is not beyond the target region, the range of the target region is kept unchanged.

In some embodiments, during the process of adjusting the range of the target region, content displayed on the input apparatus remains unchanged. In some other embodiments, during the process of adjusting the range of the target region, the adjusted target region on the input apparatus is displayed based on a transparence parameter.

It should be noted that, in the embodiments of the present disclosure, if the above display method is realized in the form of software function units and are sold or used as independent products, the display method can be stored in a computer-readable storage medium. On the basis of such an understanding, the technical solution of the present disclosure, in essence, encompasses all or a part of the technical solution which contributes to the conventional technology in the form of software products, which may be stored in a storage medium, including instructions to cause a computer device (a personal computer, a server, a network device, or the like) to execute the entire or a part of method consistent with the disclosure, such as one of the example methods described above. The aforementioned storage medium may include but is not limited to a medium that can store program codes, such as a Universal Serial Bus (USB) flash drive, a Read-Only Memory (ROM), a Random Access Memory (RAM), a portable hard disk, a magnetic disk or an optical disk. The embodiments of the present disclosure are not limited to any specific combination of hardware and software.

Figure 5:
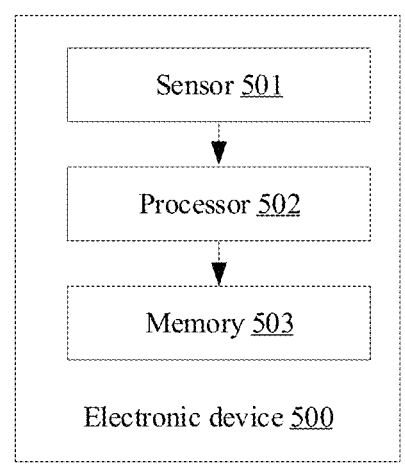
FIG. 5 is a schematic diagram of hardware of an electronic device according to an embodiment of the present disclosure.

Correspondingly, another embodiment of the present disclosure provides an electronic device. FIG. 5 is a schematic diagram of hardware of an electronic device according to an embodiment of the present disclosure. As shown in FIG. 5, the electronic device 500 includes a sensor 501, a processor 502, and a memory 503.

The sensor 501 is configured to acquire continuous input data on an input apparatus of an electronic device;

The processor 502 is configured to obtain the continuous input data acquired by the sensor, and if an input position of initial input data of the continuous input data satisfies a position condition, adjust a range of a target region on the input apparatus, so that, during a process of continuously acquiring the continuous input data, the input position of the continuous input data remains within the range of the adjusted target region.

The target region is at least used to control a position of an indicator on a display apparatus of the electronic device.

The memory 503 (which optionally includes one or more computer readable storage mediums) is configured to store a computer program that can be run on the processor 501 and execute a display method consistent with the disclosure, such as one of the above-described example methods.

It should be noted that descriptions of the foregoing apparatus embodiments are similar to the descriptions of the foregoing method embodiments. The apparatus embodiments have similar beneficial effects to the method embodiments. Therefore, details are not described herein. To understand technical details that are not disclosed in the apparatus embodiments of the present disclosure, reference may be made to the descriptions of the method embodiments of the present disclosure.

In the several embodiments provided in the present disclosure, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the exemplary embodiments.

In addition, functional units in the exemplary embodiments of the present disclosure may be all integrated in a processing unit, each unit is separately used as a unit, or two or more units are integrated in a unit. The integrated unit may be implemented in a form of hardware, or may be implemented in form of hardware plus a software functional unit.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the foregoing method embodiments are performed. The foregoing storage medium may include various mediums capable of storing program codes, such as a portable storage device, a Read-Only Memory (ROM), a magnetic disk, or an optical disk.

When the integrated unit of the present disclosure is realized in the form of software function units and are sold or used as independent products, the integrated unit may be stored in a computer-readable storage medium. On the basis of such an understanding, the technical solution of the present disclosure can be implemented in the form of software products, which may be stored in a storage medium, including instructions to cause a computer device (a personal computer, a server, a network device, or the like) to execute all or a part of the steps of the above-mentioned method in the embodiments of the present disclosure. The aforementioned storage medium may include but not limited to a medium that can store program codes, such as a Universal Serial Bus (USB) flash drive, a Read-Only Memory (ROM), a Random Access Memory (RAM), a portable hard disk, a magnetic disk, or an optical disk.

The foregoing descriptions are merely specific implementation manners of the present disclosure, but are not intended to limit the scope of the present disclosure. Any variation or replacement readily figured out by a person skilled in the art within the technical scope disclosed in the present disclosure shall fall within the scope of the present disclosure. The protection scope of the present invention is defined by the claims set forth below.

What is claimed is:

1. A display method comprising:
   acquiring continuous input data input on an input apparatus of an electronic device; and
   in response to an input position of initial input data of the continuous input data satisfies a position condition during a process of continuously acquiring the continuous input data, adjusting a range of a target region on the input apparatus to keep an input position of the continuous input data within the range of the target region after being adjusted, the target region being configured to at least control a position of an indicator on a display apparatus of the electronic device, wherein adjusting the range of the target region includes moving the target region with a range of an input track corresponding to the continuous input data.

2. The method according to claim 1, wherein:
   the input apparatus does not include the target region at a time of starting to acquire the continuous input data; and
   the input position of the initial input data satisfying the position condition includes the input position of the initial input data being within a specific region.

3. The method according to claim 1, wherein:
   the input apparatus includes the target region at a time of starting to acquire the continuous input data; and
   the input position of the initial input data satisfying the position condition includes the input position of the initial input data being within the target region.

4. The method according to claim 1, wherein adjusting the range of the target region includes continuously enlarging the range of the target region based on an input track corresponding to the continuous input data.

5. The method according to claim 1, wherein adjusting the range of the target region includes adjusting the range of the target region to a threshold range.

6. The method according to claim 1, further comprising:
   in response to the process of continuously acquiring the continuous input data having completed, adjusting the input apparatus from a current state to an original state, the original state being a state before the continuous input data is acquired.

7. The method according to claim 1, further comprising:
   in response to the input position of the initial input data not being beyond the target region, keeping the range of the target region unchanged.

8. The method according to claim 1, wherein content displayed on the input apparatus remains unchanged during a process of adjusting the range of the target region.

9. The method according to claim 1, wherein the target region being adjusted is displayed based on a transparence parameter during a process of adjusting the range of the target region.

10. An electronic device comprising:
    a sensor configured to acquire continuous input data input on an input apparatus of the electronic device;
    a memory storing a computer program; and
    a processor configured to execute the computer program to:
       obtain the continuous input data from the sensor; and
       in response to an input position of initial input data of the continuous input data satisfies a position condition during a process of continuously acquiring the continuous input data, adjust a range of a target region on the input apparatus to keep an input position of the continuous input data within the range of the target region after being adjusted, the target region being configured to at least control a position of an indicator on a display apparatus of the electronic device, wherein the processor is further configured to move the target region with a range of an input track corresponding to the continuous input data.

11. The electronic device according to claim 10, wherein:
the input apparatus does not include the target region at a time of starting to acquire the continuous input data; and
the processor is further configured to determine that the input position of the initial input data satisfies the position condition in response to detecting that the input position of the initial input data is within a specific region.

12. The electronic device according to claim 10, wherein:
the input apparatus includes the target region at a time of starting to acquire the continuous input data; and
the processor is further configured to determine that the input position of the initial input data satisfies the position condition in response to detecting that the input position of the initial input data is within the target region.

13. The electronic device according to claim 10, wherein the processor is further configured to continuously enlarge the range of the target region based on an input track corresponding to the continuous input data in response to the input position of the initial input data satisfies the position condition.

14. The electronic device according to claim 10, wherein the processor is further configured to adjust the range of the target region to a threshold range in response to the input position of the initial input data satisfies the position condition.

15. The electronic device according to claim 10, wherein the processor is further configured to, in response to the process of continuously acquiring the continuous input data having completed, adjust the input apparatus from a current state to an original state, the original state being a state before the continuous input data is acquired.

16. The electronic device according to claim 10, the processor is further configured to, in response to the input position of the initial input data not being beyond the target region, keep the range of the target region unchanged.

17. The electronic device according to claim 10, wherein content displayed on the input apparatus remains unchanged during a process of adjusting the range of the target region.

18. The electronic device according to claim 10, wherein the target region being adjusted is displayed based on a transparence parameter during a process of adjusting the range of the target region.

* * * * *